(12) United States Patent
Breitzke

(10) Patent No.: US 12,605,799 B2
(45) Date of Patent: Apr. 21, 2026

(54) MEASURING BODY FOR VERIFYING GEOMETRICAL DEVIATIONS OF A 3-AXIS MACHINE TOOL, 3-AXIS MACHINE TOOL, AND METHOD FOR COMPENSATING GEOMETRICAL DEVIATIONS OF A 3-AXIS MACHINE TOOL

(71) Applicant: Röders GmbH, Soltau (DE)

(72) Inventor: André Breitzke, Schneverdingen (DE)

(73) Assignee: RÖDERS GMBH, Soltau (DE)

( * ) Notice: Subject to any disclaimer, the term of this patent is extended or adjusted under 35 U.S.C. 154(b) by 406 days.

(21) Appl. No.: 18/251,821

(22) PCT Filed: Nov. 9, 2021

(86) PCT No.: PCT/EP2021/081108
§ 371 (c)(1),
(2) Date: May 4, 2023

(87) PCT Pub. No.: WO2022/101197
PCT Pub. Date: May 19, 2022

(65) Prior Publication Data
US 2024/0001503 A1 Jan. 4, 2024

(30) Foreign Application Priority Data

Nov. 16, 2020 (DE) .......................... 102020130193.6

(51) Int. Cl.
*B23Q 15/12* (2006.01)
*G05B 19/401* (2006.01)
*G05B 19/404* (2006.01)
(52) U.S. Cl.
CPC ........... *B23Q 15/12* (2013.01); *G05B 19/401* (2013.01); *G05B 19/404* (2013.01)
(58) Field of Classification Search
None
See application file for complete search history.

(56) References Cited

U.S. PATENT DOCUMENTS

| | | | |
|---|---|---|---|
| 5,313,410 A | 5/1994 | Watts | |
| 2012/0066922 A1 | 3/2012 | Dreier | |
| 2025/0065464 A1* | 2/2025 | Breitzke | ................ G01B 21/00 |

FOREIGN PATENT DOCUMENTS

| | | |
|---|---|---|
| CN | 102124298 A | 7/2011 |
| CN | 203224200 U | 10/2013 |

(Continued)

OTHER PUBLICATIONS

Viprey F et al: "Novel multi-feature bar design for machine tools geometric errors identification", Precision Engineering, Elsevier, Amsterdam, NL Bd. 46, Jun. 18, 2016 (Jun. 18, 2016), pp. 323-338, XP029659309, ISSN: 0141-6359, DOI: 10.1016/ J. Precision Eng. Jun. 2016 . 002 2 . New design of the thermo-invariant MFB standard; pp. 325-327.

(Continued)

*Primary Examiner* — Ryan A Jarrett
(74) *Attorney, Agent, or Firm* — SHUTTLEWORTH & INGERSOLL, PLC; Timothy J. Klima

(57) ABSTRACT

The invention relates to a measuring body for verifying geometrical deviations in a 3-axis machine tool comprising a base plate, a first wall which is arranged on the base plate and projects perpendicularly from the base plate, a second wall which is arranged on the base plate and projects perpendicularly from the base plate wherein a first row of holes and a second row of holes are formed in the base plate, wherein the first wall has, at an upper exposed region, a stepped region with a plurality of steps and wherein the second wall has, at an upper exposed region, a stepped region with a plurality of steps. The invention further relates to a 3-axis machine tool having a measuring body of this kind, and to a method for verifying and compensating geometrical deviations of the 3-axis machine tool.

13 Claims, 4 Drawing Sheets

(56)     References Cited

FOREIGN PATENT DOCUMENTS

Figure 1:
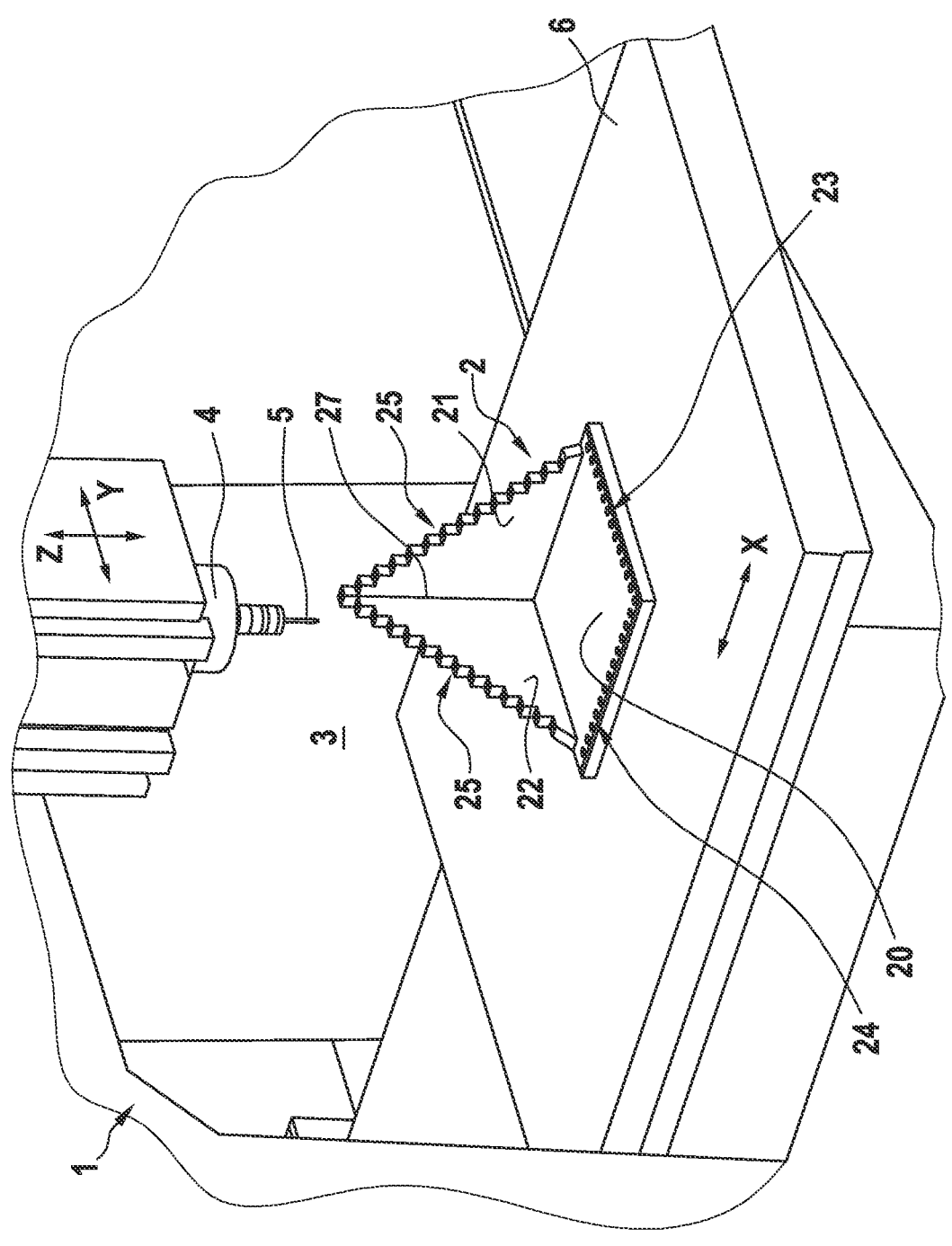

| | | | |
|---|---|---|---|
| CN | 207816905 | U | 9/2018 |
| DE | 19507806 | A1 | 9/1996 |
| DE | 29618726 | U1 | 2/1997 |
| DE | 102016212651 | A1 | 9/2016 |
| DE | 202017106555 | U1 | 12/2017 |
| EP | 1505464 | A2 | 2/2005 |
| EP | 3611464 | A1 | 2/2020 |
| JP | S57125812 | A | 8/1982 |
| JP | S6046579 | U | 4/1985 |
| JP | H0569280 | A | 3/1993 |
| JP | H07204992 | A | 8/1995 |
| JP | 2006064385 | A | 3/2006 |
| JP | 2012500397 | A | 1/2012 |
| JP | 2015105847 | A | 6/2015 |
| JP | 2017077271 | A | 4/2017 |

OTHER PUBLICATIONS

International Search Report dated Feb. 18, 2022 from counterpart PCT App No. PCT/EP2021/081108.
German Office Action dated Jul. 12, 2021 from counterpart German App No. 102020130193.6.
Japanese Office Action dated Apr. 23, 2024 from counterpart Japanese Patent Application No. 2023-528994.
Japanese Office Action dated Sep. 30, 2024 from counterpart Japanese Patent Application No. 2023-528994.
Chinese Office Action dated May 27, 2025 from counterpart Chinese App No. 2021800754098.

* cited by examiner

MEASURING BODY FOR VERIFYING GEOMETRICAL DEVIATIONS OF A 3-AXIS MACHINE TOOL, 3-AXIS MACHINE TOOL, AND METHOD FOR COMPENSATING GEOMETRICAL DEVIATIONS OF A 3-AXIS MACHINE TOOL

This application is the National Phase of International Application PCT/EP2021/081108 filed Nov. 9, 2021 which designated the U.S.

This application claims priority to German Patent Application No. 102020130193.6 filed Nov. 16, 2020, which applications are incorporated by reference herein.

DESCRIPTION

The present invention relates to a measuring body for verifying geometrical deviations of a 3-axis machine tool, and to a 3-axis machine tool having improved geometric accuracy, and to a method for verifying and compensating geometrical deviations of a 3-axis machine tool.

Geometric accuracy of a machine tool has been a well-known issue in machine tools. The geometric accuracy of a machine tool is determined by the relative deviation of the actual position and orientation of the tool with respect to the workpiece from the nominal position and orientation. This error is thus causal for deviations from the ideal workpiece geometry and thus for the working accuracy of a machine tool. To improve geometric accuracy, single axis deviations as well as the position and orientation of the single axes to each other are generally considered.

Assuming a rigid body model, a 3-axis machine tool has three linear deviations (once in the axis direction and twice perpendicular to the axis direction) and three rotational deviations (yaw, pitch and roll). Thus, there are six deviations for each linear axis, resulting in 18 deviations for the three linear axes. In addition, three perpendicularity deviations of the linear axes to each other must be considered. Thus, a 3-axis machine tool has a total of 21 possible errors in the geometry. The individual deviations can overlap and then actually lead to a large total error, which influences the geometric accuracy of the machine tool in an undesirable manner.

It is the object of the present invention to provide a measuring body for verifying geometrical deviations of a 3-axis machine tool, a 3-axis machine tool and a method for verifying and compensating geometrical deviations of a 3-axis machine tool, wherein the measuring body and the 3-axis machine tool are designed as simply and inexpensively as possible and the method can be carried out as inexpensively and quickly as possible.

This object will be achieved by a measuring body, a 3-axis machine tool, and a method having features as disclosed herein. Preferred further embodiments of the invention are also disclosed herein.

The measuring body according to the invention for verifying geometrical deviations of a 3-axis machine tool having features as disclosed herein, on the other hand, has the advantage that geometrical deviations of the 3-axis machine tool can be compensated using the measuring body, so that the 3-axis machine tool has no linear deviations and no perpendicularity deviations. This means that workpieces can then be machined with maximum precision using the 3-axis machine tool. The correction data determined on the basis of the measuring body may directly be used for error compensation of the 3-axis machine tool. According to the invention, this will be achieved by the measuring body having a base plate, a first wall and a second wall. The first wall is arranged on the base plate and projects vertically from the base plate. The second wall is also arranged to project vertically from the base plate. Herein, a first row of holes and a second row of holes are formed in the base plate. Furthermore, the first wall is formed in a stair-step shape with a plurality of steps on the side facing away from the base plate. Similarly, the second wall is also formed in a stair-step shape with a plurality of steps on the side facing away from the base plate. Thus, the stepped region of the first wall and the second wall are respectively located at the upper, exposed region of the first wall and the second wall. Thus, the upper exposed region of the first and second walls forms a staircase at which different positions can be detected in the Z-direction, with the base plate spanning a base plane in the X-and Y-directions. Due to the upper, exposed stepped region of the first and second walls, the first and second walls have a substantially triangular shape.

Preferably, the first wall is arranged along a first edge of the base plate and the second wall is arranged along a second edge of the base plate. Furthermore, the first row of holes is arranged along a third edge of the base plate and the second row of holes is arranged along a fourth edge of the base plate. Thus, the rectangular, preferably square, base plate has the first and second walls along two edges and the first and second rows of holes along the other two edges.

Most preferably, the first and second walls are arranged such that they adjoin each other at a corner of the base plate or form a corner region. In this case, the first and second walls can be arranged on the base plate or, alternatively, the first and second walls are arranged on lateral regions of the base plate and the corner of the base plate is located in a corner line of the contacting first and second walls.

Preferably, the first wall and the second wall are identically formed for ease of fabrication of the measuring body. Further preferably, each stepped surface of the stair-shaped region of each wall has a reference hole. Preferably, the reference hole is centrally formed in the stepped surface. Further preferably, each stepped surface is ground or milled. Preferably, the reference holes are bores. This allows the hole and the ground surface to each be taken as a reference element, with the ground surface of the step being used to determine the Z coordinate and a center point of a hole being used as the X and Y coordinates.

Further preferably, a first reference surface is formed on the base plate adjacent to the first row of holes, and a second reference surface is formed on the base plate adjacent to the second row of holes. The two reference surfaces are thus also reference elements and are each configured for determining Z coordinates.

In order to make the measurement process as simple as possible, the holes of the first row of holes are arranged on a first straight line and the holes of the second row of holes are arranged on a second straight line. The first straight line is preferably perpendicular to the second straight line.

Further preferably, the first and second reference surfaces are arranged adjacent to the rows of holes in a strip shape and parallel to the rows of holes. Most preferably, the first and second reference surfaces are ground or milled surfaces. Further preferably, the first and second reference surfaces extend parallel to the edge of the base plate.

Most preferably, the first and second rows of holes are comprised of an identical number of holes, an identical hole spacing, and an identical hole diameter.

The measuring body is preferably made of Invar. Invar has a very low coefficient of thermal expansion, and therefore is particularly suitable for manufacturing the measuring body. Further preferably, a thickness of the first and second walls and a thickness of the base plate are the same.

Furthermore, the present invention relates to a 3-axis machine tool comprising a tool spindle, a measuring device, in particular a 3D measuring probe, which is clampable into the tool spindle, and a control unit for controlling the 3-axis machine tool. Furthermore, the 3-axis machine tool comprises a measuring body according to the invention, wherein the control unit is configured to perform a correction of the geometric data of the 3-axis machine tool based on a nominal/actual comparison of previously determined geometric nominal dimensions of the measuring body with geometric actual dimensions of the measuring body determined by the measuring device in the 3-axis machine tool. Thus, the control unit has a memory in which the geometric nominal dimensions of the measuring body, which were determined in a previous step in a measuring machine, are stored. To determine the actual geometric dimensions of the measuring body in the 3-axis machine tool, the control unit preferably starts an NC program for measuring the measuring body in order to determine the actual values of the measuring body. Thus, by comparing the nominal values with the actual values, a correction of geometric data of the 3-axis machine tool can be made, which significantly improves the accuracy of machining of workpieces by the 3-axis machine tool. Accordingly, compensation of geometrical errors of the 3-axis machine tool can be achieved in a simple manner. The nominal values are preferably stored in a memory. Further preferably, the measuring body comprises a three-point abutment used to place or clamp the measuring body onto the machine table. This means that the measuring body stands on three feet, which are arranged below the base plate as far apart as possible.

Furthermore, the present invention relates to a method for verifying and compensating geometrical deviations of a 3-axis machine tool, the method comprising the steps of:

clamping a measuring device, in particular a 3D measuring probe, in a spindle of the 3-axis machine tool, arranging a measuring body in a work area of the 3-axis machine tool, moving to a plurality of different positions of the measuring body to collect geometric actual data of the measuring body, performing a nominal/actual comparison between the acquired actual data and predetermined nominal data of the measuring body to determine geometrical deviations, and compensating the geometrical deviations of the 3-axis machine tool in a control unit of the 3-axis machine tool to increase working accuracy of the 3-axis machine tool.

The process according to the invention can be performed in a relatively fast and safe manner. In particular, the method according to the invention may also be performed in a short time following delivery of a 3-axis machine tool to a customer, so that conditions prevailing there, in particular temperature conditions at the customer's site, are no longer detrimental to the geometric accuracy of the 3-axis machine tool in operation.

Of course, it is also possible to perform the method at the manufacturer of the 3-axis machine tool to optimize manufacturing processes at the manufacturer's site of the 3-axis machine tool, if required.

Preferably, the nominal values of the measuring body are determined in advance in a coordinate measuring machine and the measuring body will then be arranged in the work area of the 3-axis machine tool such that a coordinate system of the measuring body coincides with a coordinate system of the 3-axis machine tool.

Further preferably, when the measuring body is measured in the 3-axis machine tool, a temperature of the working space is detected and correction of the actual data will be performed based on the detected temperature of the work area. This further improves compensation accuracy of geometrical deviations.

The method according to the invention preferably determines position deviations of the respective axes in the X-direction, Y-direction and Z-direction respectively and furthermore two straightness deviations of the respective axes. Thus, a total of nine different geometric error sources can be detected.

Further preferably, perpendicularity errors are calculated between each of the three axes, i.e., the X-axis, the Y-axis, and the Z-axis, whereby the accuracy for compensating geometrical deviations is further improved and a total of twelve geometrical deviations can be detected.

Figure 2:
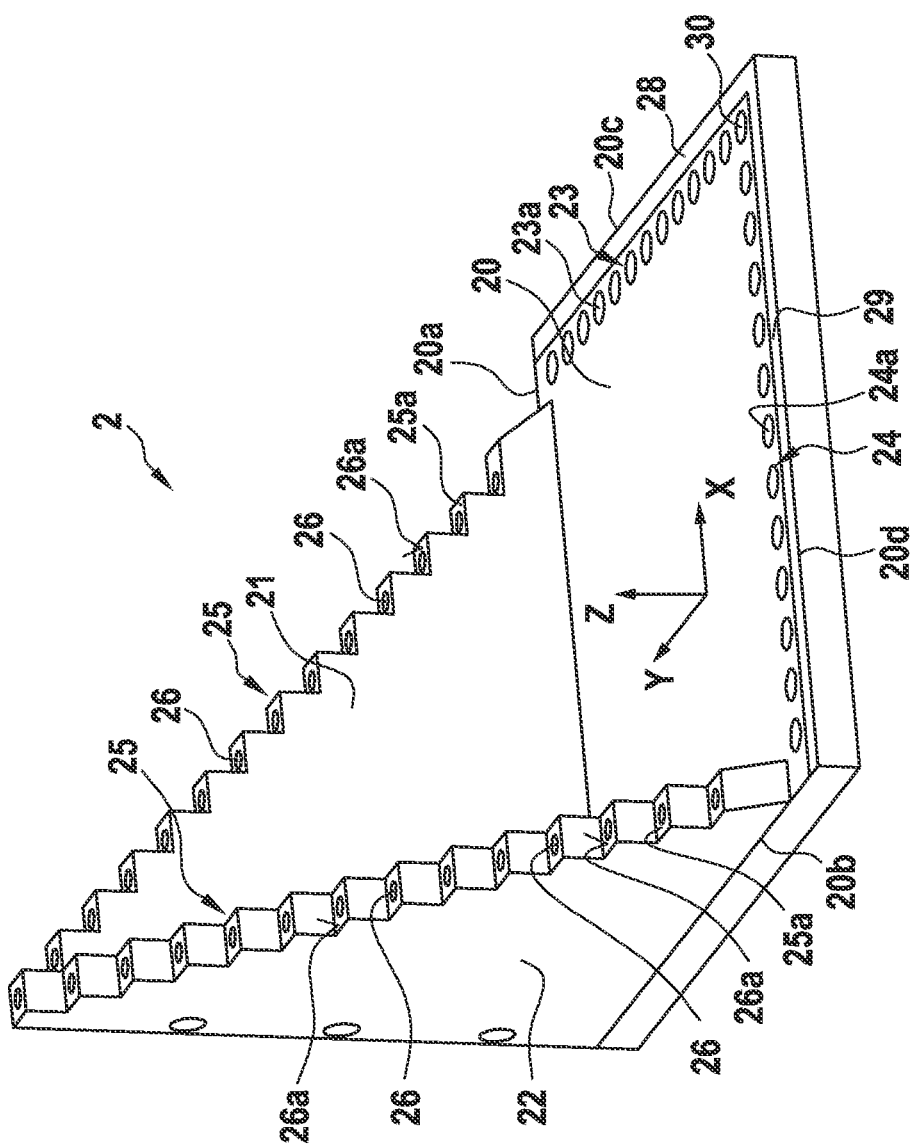
Figure 3:
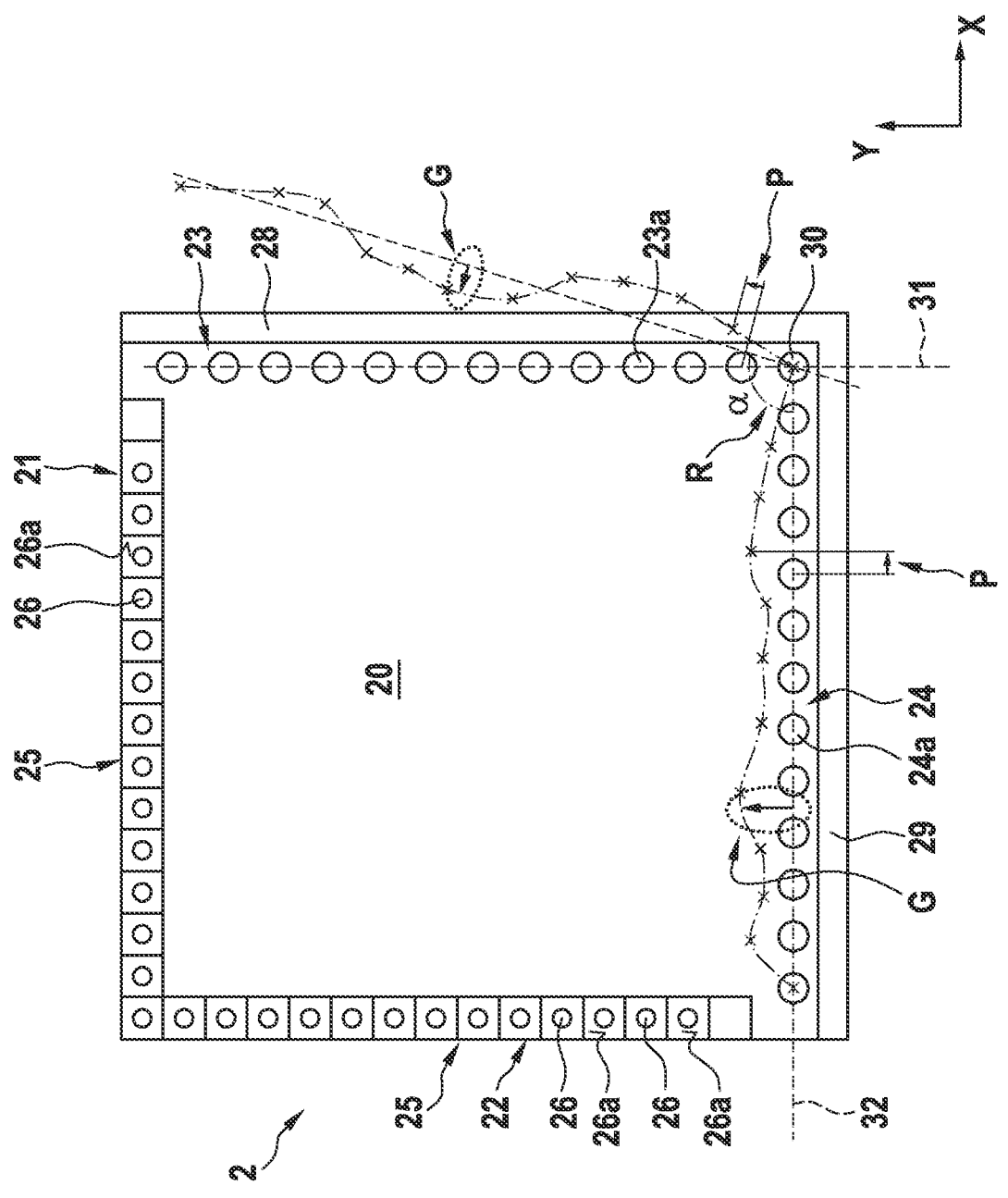
Figure 4:
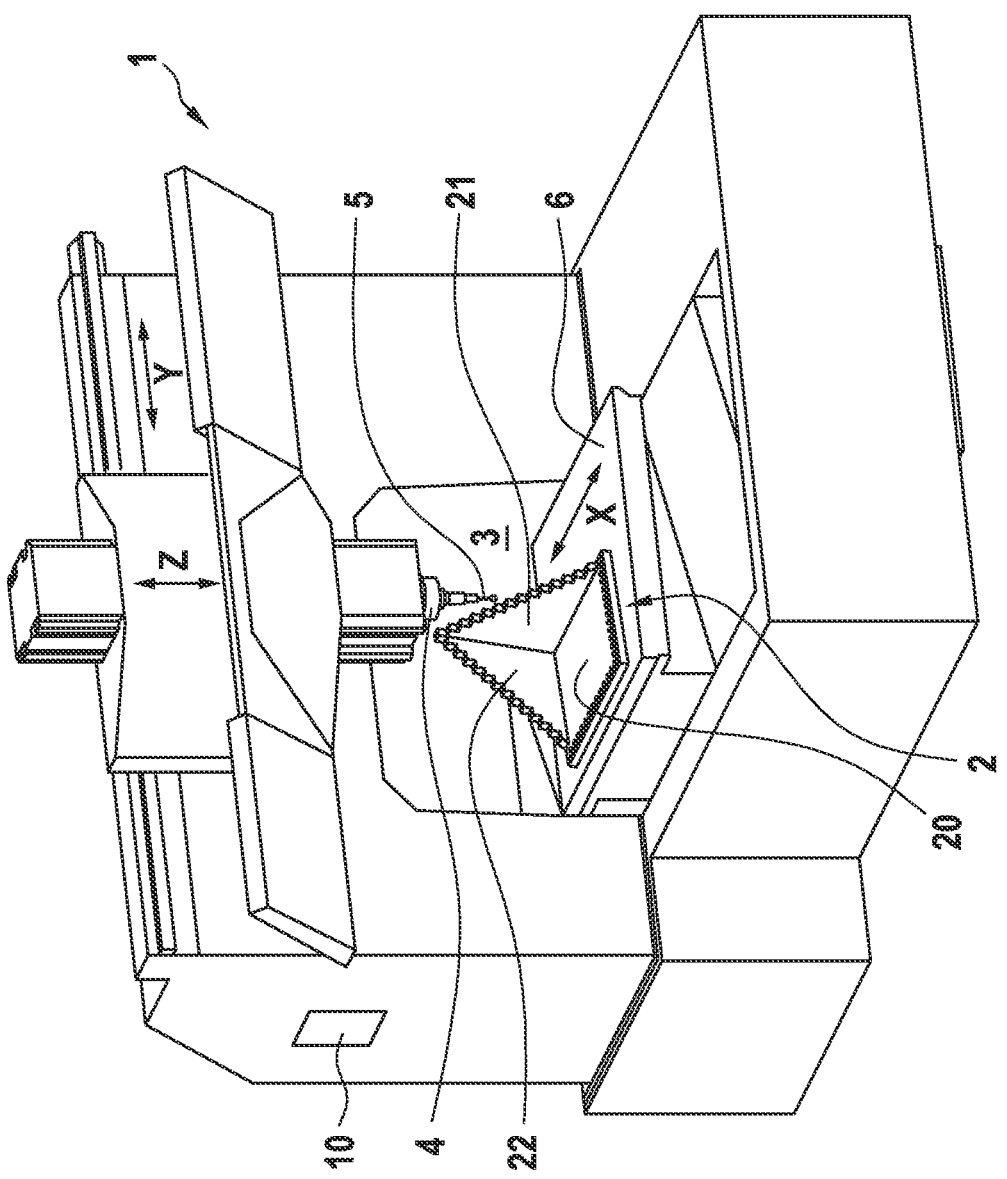

A preferred example embodiment of the invention is described below while reference will be made to the accompanying drawings, wherein:

FIG. 1 is a schematic, perspective view of a measuring body in a 3-axis machine tool according to a preferred example embodiment of the invention, FIG. 2 is a schematic, perspective view of the measuring body of FIG. 1 from another perspective view, FIG. 3 is a schematic top view of the measuring body of FIG. 2, and FIG. 4 is a schematic, perspective overall view of the 3-axis machine tool of FIG. 1.

In the following, a 3-axis machine tool 1 having a measuring body 2 for verifying geometrical deviations of the 3-axis machine tool will be described in detail while making reference to the FIGS. 1 to 4.

Furthermore, a method for verifying and compensating geometrical deviations of a 3-axis machine tool will also be described while making reference to the FIGS. 1 to 4.

As may be seen from FIGS. 1 and 4, the 3-axis machine tool 1 comprises a work area 3, a spindle 4 and a control unit 10.

As may be seen from FIG. 1 and FIG. 4, a measuring body 2 is arranged on a machine table 6 of the 3-axis machine tool 1.

The measuring body 2 is shown in detail in FIGS. 2 and 3. The measuring body 2 is configured for verifying geometrical deviations of the 3-axis machine tool. In particular, the measuring body 2 can be used to very precisely determine coordinates for positioning a tool of the 3-axis machine tool 1.

The measuring body 2 comprises a planar base plate 20, which spans a base plane in an X-direction and a Y-direction. Further, the measuring body 2 comprises a first wall 21 and a second wall 22. The first wall 21 and the second wall 22 are arranged on the base plate 20, and perpendicularly projecting from the base plate 20.

As may be seen from FIG. 2, the first wall 21 and the second wall 22 are arranged on the base surface of the base plate 20.

The first wall 21 and the second wall 22 are arranged along edges of the base plate 20. More specifically, the first wall 21 is arranged along a first edge 20a of the base plate 20 and the second wall 22 is arranged along a second edge 20b of the base plate 20.

The first and second walls 21, 22 are thereby arranged on the base plate 20 such that the first and second walls will contact each other at a corner of the base plate. This creates a corner line 27 (cf. FIG. 1), which is perpendicular to the base surface of the base plate 20.

As may be seen from FIGS. 1 and 2, the first wall 21 and the second wall 22 are triangular in shape, with steps formed at an upper free end of each of the first and second walls. Thus, a triangle of steps is formed, with a stepped region 25 exposed on each wall. As shown in FIG. 2, each step 25*a* has a reference hole 26 and a ground or milled stepped surface 26*a*. A thickness of the first and second walls is preferably selected to be the same. Further preferably, a thickness of the base plate 20 is also the same as the wall thicknesses of the walls 21, 22.

Furthermore, the measuring body 2 comprises a first row of holes 23 and a second row of holes 24 in the base plate 20. The first row of holes 23 comprises a plurality of holes 23*a* arranged on a first straight line 31. The second row of holes 24 comprises a plurality of second holes 24*a*, which are arranged on a second straight line 32. Herein, the respective centers of the holes 23*a*, 24*a* are arranged on the straight lines 31, 32. The first and second straight lines 31, 32 intersect at a right angle.

As may be seen from FIG. 2, a first strip-shaped reference surface 28 is arranged next to the first row of holes 23. A second strip-shaped reference surface 29 is arranged next to the second row of holes 24. The reference surfaces are located between the rows of holes and a third edge 20*c* and a fourth edge 20*d*, respectively (cf. FIG. 2).

The base plate 20 is square-shaped, so that the number of holes in the first and second rows of holes 23, 24 is identical. A hole 30 common to both rows of holes is provided in the corner opposite to the corner where the wall portions contact each other.

As shown in FIG. 2, a Z-direction is perpendicular to the X-direction and perpendicular to the Y-direction.

The measuring body 2 is fixed on the machine table 6 of the 3-axis machine tool 1. Furthermore, a 3D measuring probe is arranged in the spindle 4, used to perform a determination of actual coordinates of the 3-axis machine tool by means of the measuring body 2.

The 3-axis machine tool 1 further comprises the control unit 10, which is configured to control the 3-axis machine tool. The control unit 10 is further configured to perform a correction of the geometric data of the 3-axis machine tool 1 based on a nominal/actual comparison of the geometric dimensions of the measuring body 2.

As explained above, the 3-axis machine tool comprises three linear axes, namely a first axis in the X-direction, a second axis in the Y-direction and a third axis in the Z-direction.

In total, the three linear axes result in twenty-one deviations, three of which are perpendicularity deviations of the linear axes to each other. Thus, a total of twenty-one error parameters result for the 3-axis machine tool.

Using the method according to the invention, verification and correction of position deviations, straightness deviations and perpendicularity deviations of the 3-axis machine tool as shown in FIG. 4, which is a gantry machine, can thus be performed.

For this purpose, the measuring body 2 is first to be measured by means of a coordinate measuring machine, which is not shown, to generate nominal values. These nominal values are then supplied to the control unit 10 of the 3-axis machine tool 1 and stored in a memory. To measure the measuring body 2, a coordinate system is established such that an X-Y plane is parallel to the base plate 20. The geometry of the measuring body 2, which is preferably made of Invar, is thus determined on the basis of repeatedly determined Z positions, X positions and Y positions of various reference elements of the measuring body 2. At the same time, a zero point of the coordinate system of the measuring body 2 is also determined. The ground stepped surfaces 26*a* and the first and second reference surfaces 28, 29 for the Z positions, for example, are used as reference elements. The holes of the rows of holes 23, 24 and the holes 26 in the steps serve as reference elements for the X positions and Y positions.

The measuring body 2 is now placed on the machine table 6 in the work area 3 of the 3-axis machine tool to measure the geometrical deviations of the 3-axis machine tool. During this process, the measuring body 2 can be clamped or otherwise fixed on a machine table. In this case, the X-Y-Z coordinate system of the measuring body should basically be aligned parallel to the X-Y-Z coordinate system of the 3-axis machine tool. The measurement of the measuring body 2 in the 3-axis machine tool 1 will then be performed using the 3-D measuring device 5, e.g. a 3-D measuring probe. Typically, modern 3-axis machine tools have such a 3-D measuring probe, for example, for detecting component positions and component geometries.

Prior to measuring, the coordinate system of the 3-axis machine tool is thus aligned identically with the coordinate system of the coordinate measuring machine in which the measuring body 2 was previously measured.

After fixing the measuring body 2 in the work area 3 of the 3-axis machine tool, the control unit 10 can preferably run a fully automatic NC program to measure the measuring body 2 using the 3D measuring probe 5 thus determining the actual values of the 3-axis machine tool 1.

Preferably, when measuring the measuring body 2 in the work area of the 3-axis machine tool 1, the temperature of the work area 3 of the 3-axis machine tool 1 is also measured and is stored. If this temperature of the work area differs from a reference temperature, e.g. 20° C., a thermal expansion coefficient of the workpieces to be machined on the 3-axis machine tool must be taken into account during workpiece machining. Correction of the actual values of the 3-axis machine tool must then be made accordingly at this point.

Following completion of the measurement of the measuring body 2 in the 3-axis machine tool 1 and, if necessary, thermal adjustment of the actual values, the actual values of the 3-axis machine tool are determined and can be compared with the nominal values of the measuring body. By comparing the nominal/actual values, the geometrical deviations of the 3-axis machine tool in the form of position deviations, straightness deviations and perpendicularity deviations can be calculated and thus can be verified and corrected. FIG. 3 shows an example of straightness deviations G, a perpendicularity deviation R and position deviations P in a top view of the measuring body 2.

For example, an X-axis position deviation can first be determined by evaluating the differences of actual positions and nominal positions in the X-direction of the measured reference elements on the base plate 20 along the X-axis. Since the zero point of the measuring body 2 and the position of the reference elements relative to the zero point are known, the determined differences can be assigned to X-axis positions of the 3-axis machine tool. This results in a table of X-axis positions of the 3-axis machine tool and position deviations in the X-direction at these X-axis positions. These position deviations can thereby be stored and used directly as correction data for an error compensation of the 3-axis machine tool in the control unit 10.

Alternatively, the deviations could also be mathematically preprocessed. For example, the deviations can also be approximated with various mathematical functions. Particularly in the case of small measuring bodies 2 with few reference elements, for example, an approximation of the differences with a straight line (compensation line) is conceivable. In this case, only a scaling error is corrected.

Since the measuring body 2 covers only part of the work area 3 of the 3-axis machine tool, the acquired actual values are preferably extrapolated by means of a corresponding mathematical function. In this way, deviations are obtained for the entire work area 3 of the 3-axis machine tool 1.

Straightness deviations G of the X-axis are determined in the same way. Herein, the position deviations P in the Y-direction and Z-direction, respectively, are assigned to the X-axis positions. The differences between actual position and nominal positions in the Y-direction result from the determined centers of the holes of the row of holes 23, 24 and the reference holes 26 on the stepped region 25. The differences between actual positions and nominal positions in the Z-direction result from the reference surfaces 28, 29 on the base plate 20 and the ground stepped surfaces 26a. Also herein, mathematical preprocessing or approximation is possible.

Once the correction data for the position deviation and straightness deviation of the X-axis have been calculated, all measurement data of the actual positions of the reference elements are adjusted for further evaluation using the correction data for position deviation of the X-axis, the straightness deviation of the X-axis in the Y-direction and the straightness deviation of the X-axis in the Z-direction. At this point, it is preferred to assume that the adjusted actual position no longer has any errors in the X-direction. This allows the errors in the Z-direction to be calculated in the subsequent evaluation without these Z errors being influenced by the errors in the X-direction. This is because with the wall 21 arranged in the X-direction, the X-axis must be moved so that the reference holes 26 can be measured at different Z-axis positions.

In a next step, a perpendicularity error R between the X-axis and the Y-axis can be calculated. Two compensation lines are calculated for this purpose. The first compensation line results from the X-axis position of the reference elements on the base plate 2 along the X-direction and their position deviations in the Y-direction. The second compensation line results from the Y-axis positions of the reference elements on the base plate 2 along the Y-direction and their position deviations in the X-direction. An angle α between the two compensation lines is then calculated (see FIG. 3). The determined deviation can be used directly as a correction value for an error compensation in the control unit 10.

Subsequently, the actual positions of all reference elements in the measurement data are adjusted according to their Y-position on the basis of the perpendicularity error in such a way that the measurement data no longer contain an X-Y perpendicularity error.

Then, the position deviations and the straightness deviations of the Y-axis are calculated in the same way as for the X-axis. For this purpose, the differences in the actual and nominal positions of the reference positions on the base plate 2 along the Y axis are evaluated (see FIG. 3). Together with the zero point, this results in a table with the Y-axis positions of the 3-axis machine tool and the position deviations in the X, Y and Z-directions at these Y-axis positions. The data can be further processed as for the X-axis or directly transferred to the control unit 10 as correction data for error compensation of the 3-axis machine tool. Again, the compensation data should be extrapolated with an appropriate mathematical function to define the entire work area 3.

Subsequently, all actual positions of the reference elements are adjusted for further evaluation using the correction data for the position deviation and the two straightness deviations of the Y axis. At this point, it is preferred to assume that the adjusted actual positions no longer have any errors in the Y-direction. This allows the errors in the Z-direction to be calculated in the further evaluation without these errors being influenced by the errors in the Y-direction. This is because, with the second wall 22 arranged in the Y-direction, the Y-axis must be moved so that the holes 26 can be measured at different Z-axis positions.

In a next step, the perpendicularities between the X-axis and the Z-axis are calculated. For this purpose, two compensation lines are calculated. The first compensation line results from the X-axis positions of the reference elements on the base plate 2 along the X-direction and their position deviations in the Z-direction. The second compensation line results from the Z-axis positions of the reference elements on the first wall 21 (stepped triangle) along the X-direction and their position deviations in the X-direction. Then the angle α between the two compensation lines is calculated. The deviation obtained can be used directly as a correction value for error compensation in the control unit 10.

Similarly, the perpendicularity between the Y-axis and the Z-axis is calculated. The first compensation line results from the Y-axis positions of the reference elements on the base plate 20 along the Y-direction and their position deviations in the Z-direction. The second compensation line results from the Z-axis positions of the reference elements on the second wall 22 along the Y-direction and their position deviations in the Y-direction. The perpendicularity deviations between these two straight lines can again be used directly as a correction value for error compensation.

The actual position of all reference elements are then adjusted in the measurement data according to their Z-position based on the perpendicularity errors in such a way that the measurement data no longer contain an X-Z perpendicularity error and a Y-Z perpendicularity error.

In the last step, the geometrical deviations of the Z-axis are calculated. For this purpose, the reference elements (reference holes 26 and ground step surfaces 26a) of the two triangular walls 21, 22 are used. Since the errors of the X-axis and Y-axis as well as the three perpendicularity errors have already been calculated from the measurement data in the previous evaluation, it is assumed in this step that a process in the X-direction or Y-direction, which is necessary to measure the steps, does not influence the geometrical deviations of the Z-axis.

Thus, the position deviation of the Z-axis is determined by evaluating the differences of the actual position and target position of the reference position in the Z-direction on both walls 21, 22. Since the zero point of the measuring body 2 and the position of the reference elements relative to the zero point are known, the determined differences can be assigned to Z-axis positions of the 3-axis machine tool. This results in a table of Z-axis positions, which can thus directly be used as correction data for an error compensation of the 3-axis machine tool. The data can be further processed as for the X-axis and the Y-axis or used directly as correction data. Again, the compensation data can be extrapolated using an appropriate mathematical function.

The straightness deviations of the Z-axis will be determined in a way similar to the other axes. Herein, the position deviations in the Y-direction or X-direction are assigned to the Z-axis positions. The differences between the actual position and the nominal position result from the centers of the holes as determined. Further processing of the straightness deviations may be performed identical to the Z-axis position deviation.

In this way, all geometric errors except yaw, pitch and roll, can be verified and corrected using the measuring body 2. The method is particularly suitable for the correction of a 3-axis machine tool geometry after a change in thermal conditions, since, in this case, usually linear errors arise which may smoothly be extrapolated. In addition, this method may also be used to adapt the geometry of the 3-axis machine tool to materials with different coefficients of thermal expansion if the temperature present in the work area is different from the reference temperature.

In addition to the foregoing written description of the invention, explicit reference is herewith made to the graphic representation of the invention in FIGS. 1 to 4 for supplementary disclosure thereof.

LIST OF REFERENCE NUMBERS

1 3-axis machine tool
2 Measuring body
3 Work area
4 Spindle
5 Measuring device (3D probe)
6 Machine table
10 Control unit
20 Base plate
20*a* First edge
20*b* Second edge
20*c* Third edge
20*d* Fourth edge
21 First wall
22 Second wall
23 First row of holes
23*a* Holes of first row of holes
24 Second row of holes
24*a* Holes of second row of holes
25 Stepped region
25*a* Steps
26 Reference hole
26*a* Ground step area
27 Corner line
28 First reference surface
29 Second reference surface
30 Common hole
31 First straight line
32 Second straight line
G Straightness deviation
R Perpendicularity
P Position deviation
X X-axis
Y Y-axis
Z Z-axis

The invention claimed is:
1. A measuring body for verifying geometrical deviations in a 3-axis machine tool comprising:
a base plate,
a first wall stationarily fixed on the base plate and projecting perpendicularly from the base plate, and
a second wall stationarily fixed on the base plate and projecting perpendicularly from the base plate,
wherein a first row of holes and a second row of holes are stationarily formed in the base plate, wherein the first wall, at an upper exposed region thereof, has a stepped region with a plurality of steps, and
wherein the second wall, at an upper exposed region, has a stepped region with a plurality of steps,
wherein the stationary fixing of the first wall and the second wall on the base plate maintains a fixed dimensional relationship between the first and second walls, and between the first and second walls and the first and second rows of holes;
wherein said first wall is arranged along a first edge of said base plate and wherein said second wall is arranged along a second edge of said base plate, wherein the first row of holes is arranged along a third edge of said base plate and wherein the second row of holes is arranged along a fourth edge of said base plate;
wherein the first wall and the second wall are adjacent to each other at a corner of the base plate.
2. The measuring body according to claim 1, wherein the steps of the first wall and the second wall have equal step heights and/or equal step lengths and/or equal step numbers.
3. The measuring body according to claim 1, wherein each surface of the stepped region has a ground or milled stepped surface and a reference hole.
4. The measuring body according to claim 1, wherein, adjacent to the first row of holes, a first reference surface is arranged as a reference for a Z-direction and, adjacent to the second row of holes, a second reference surface is arranged as a reference for the Z-direction, wherein the Z-direction is perpendicular to the base plate.
5. The measuring body according to claim 4, wherein the holes of the first row of holes are located on a first straight line and/or wherein the holes of the second row of holes are located on a second straight line.
6. The measuring body according to claim 5, wherein the first reference surface and the second reference surface are arranged in a strip shape and parallel to the first row of holes and the second row of holes.
7. A 3-axis machine tool comprising
a tool spindle
the measuring body according to claim 1,
a measuring device which is clampable into the tool spindle and configured to detect actual values of the measuring body fixed in the 3-axis machine tool, and
a control unit configured to control the 3-axis machine tool,
wherein the control unit is further configured to perform a nominal-actual comparison based on geometric nominal values of the dimensions of the measuring body and the actual values of the measuring body fixed in the 3-axis machine tool determined for the 3-axis machine tool using the measuring device and, if deviations occur between the nominal values and the actual values, to perform correction of geometric data of the 3-axis machine tool in the control program of the control unit.
8. The 3-axis machine tool according to claim 7, wherein the control unit comprises a memory in which the nominal values of the measuring body are stored.
9. A method for verifying and compensating geometrical deviations of a 3-axis machine tool comprising the steps:
clamping of a measuring device in a tool spindle of the 3-axis machine tool,
providing a measuring body for verifying geometrical deviations in a 3-axis machine tool comprising:
a base plate,
a first wall stationarily fixed on the base plate and projecting perpendicularly from the base plate, and a second wall stationarily fixed on the base plate and projecting perpendicularly from the base plate, wherein a first row of holes and a second row of holes are stationarily formed in the base plate, wherein the first wall, at an upper exposed region thereof, has a stepped region with a plurality of steps, and wherein the second wall, at an upper exposed region, has a stepped region with a plurality of steps, wherein the stationary fixing of the first wall and the second wall on the base plate maintains a fixed dimensional relationship between the first and second walls and between the first and second walls and the first and second rows of holes;

wherein said first wall is arranged along a first edge of said base plate and wherein said second wall is arranged along a second edge of said base plate, wherein the first row of holes is arranged along a third edge of said base plate and wherein the second row of holes is arranged along a fourth edge of said base plate;

wherein the first wall and the second wall are adjacent to each other at a corner of the base plate;

arranging the measuring body in a work area of the 3-axis machine tool, moving to a plurality of positions of the measuring body to collect geometric actual data of the 3-axis machine tool using the measuring body, performing a nominal/actual comparison of the actual geometric data with stored nominal data of the measuring body to determine geometrical deviations, and compensating the geometrical deviations in a control unit of the 3-axis machine tool.

10. The method according to claim 9, wherein the nominal values of the measuring body were determined in advance in a coordinate measuring machine and the measuring body is arranged in the work area of the 3-axis machine tool such that the coordinate system of the measuring body coincides with the coordinate system of the 3-axis machine tool.

11. The method according to claim 9, wherein during measurement of the measuring body in the 3-axis machine tool a temperature of the work area is detected and correction of the actual data is performed based on the detected temperature of the work area.

12. The method according to claim 9, wherein position deviations of the respective axes and two straightness deviations of the respective axes are determined in the X-direction, Y-direction and Z-direction, respectively.

13. The method according to claim 9, wherein perpendicularity errors between X-axis, the Y-axis and the Z-axis are calculated.

* * * * *